United States Patent
Bamburak et al.

(10) Patent No.: US 8,081,973 B2
(45) Date of Patent: *Dec. 20, 2011

(54) METHOD FOR SELECTING A PREFERABLE WIRELESS COMMUNICATIONS SERVICE PROVIDER IN A MULTI-SERVICE PROVIDER ENVIRONMENT

(75) Inventors: Michael D. Bamburak, Columbia, MD (US); John J. Daly, Nashanic Station, NJ (US); Christopher Gregory Lawrence, Kirkland, WA (US); Michael Edward Prise, Kirkland, WA (US); Michael Allen Raffel, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 945 days.

This patent is subject to a terminal disclaimer.

(21) Appl. No.: 12/050,810

(22) Filed: Mar. 18, 2008

(65) Prior Publication Data

US 2008/0160982 A1 Jul. 3, 2008

Related U.S. Application Data

(63) Continuation of application No. 10/853,246, filed on May 26, 2004, now Pat. No. 7,346,350, which is a continuation of application No. 10/099,944, filed on Mar. 19, 2002, now Pat. No. 6,782,259, which is a continuation of application No. 08/570,904, filed on Dec. 12, 1995, now Pat. No. 6,418,318.

(51) Int. Cl.
*H04W 4/00* (2009.01)

(52) U.S. Cl. .... 455/434; 455/62; 455/166.2; 455/435.1; 455/552.1

(58) Field of Classification Search .................... 455/62, 455/67.11, 161.1, 166.2, 168.1, 432.1, 435.1, 455/435.2, 435.3, 455, 524, 525, 550.1, 552.1
See application file for complete search history.

(56) References Cited

U.S. PATENT DOCUMENTS

| | | |
|---|---|---|
| 4,788,543 A | 11/1988 | Rubin |
| 4,903,320 A | 2/1990 | Hanawa |
| 4,916,728 A | 4/1990 | Blair |
| 5,020,091 A | 5/1991 | Krolopp et al. |
| 5,040,237 A | 8/1991 | Barnes et al. |
| 5,101,500 A | 3/1992 | Marui |
| 5,159,625 A | 10/1992 | Zicker |
| 5,203,015 A | 4/1993 | George |
| 5,261,117 A | 11/1993 | Olson |
| 5,276,905 A | 1/1994 | Hurst et al. |

(Continued)

FOREIGN PATENT DOCUMENTS

CA 2115877 11/1994

(Continued)

*Primary Examiner* — Quochien B Vuong

(57) ABSTRACT

A communication device locates a preferable wireless service provider in a multi-service provider environment using a frequency or frequency band search schedule. Initially, the communication device registers with a less preferred service provider in a first frequency. While remaining registered with the less preferred service provider, the device examines several frequencies in the order specified by the frequency search schedule. The device determines whether the last frequency used by the communication device has a more preferred service provider. If the last frequency used does not have a more preferred service provider, the device examines each of the plurality of frequencies in the predetermined order in the search schedule. The examination continues until another frequency band having a more preferred service provider is located. The communication device then registers with the more preferred service provider.

23 Claims, 6 Drawing Sheets

U.S. PATENT DOCUMENTS

| | | | |
|---|---|---|---|
| 5,404,355 | A | 4/1995 | Raith |
| 5,406,643 | A | 4/1995 | Burke et al. |
| 5,412,375 | A | 5/1995 | Wood |
| 5,420,908 | A | 5/1995 | Hodges et al. |
| 5,442,806 | A | 8/1995 | Barber et al. |
| 5,463,675 | A | 10/1995 | Gerszberg |
| 5,479,484 | A | 12/1995 | Mukerjee et al. |
| 5,483,684 | A | 1/1996 | Ono et al. |
| 5,504,803 | A | 4/1996 | Yamada et al. |
| 5,509,052 | A | 4/1996 | Chia et al. |
| 5,513,242 | A | 4/1996 | Mukerjee et al. |
| 5,513,247 | A | 4/1996 | Mukerjee et al. |
| 5,517,677 | A | 5/1996 | Moon |
| 5,524,135 | A | 6/1996 | Mizikovsky et al. |
| 5,541,977 | A | 7/1996 | Hodges et al. |
| 5,550,397 | A | 8/1996 | Lifshitz et al. |
| 5,586,338 | A | 12/1996 | Lynch et al. |
| 5,590,397 | A | 12/1996 | Kojima |
| 5,603,084 | A | 2/1997 | Henry, Jr. et al. |
| 5,613,204 | A | 3/1997 | Haberman et al. |
| 5,613,208 | A | 3/1997 | Blackman et al. |
| 5,711,001 | A | 1/1998 | Bussan et al. |
| 5,734,542 | A | 3/1998 | Cohen |
| 5,734,980 | A | 3/1998 | Hooper et al. |
| 5,754,542 | A | 5/1998 | Ault et al. |
| 5,754,952 | A | 5/1998 | Hodges et al. |
| 5,761,618 | A | 6/1998 | Lynch et al. |
| 5,768,380 | A | 6/1998 | Rosauer et al. |
| 5,790,952 | A | 8/1998 | Seazholtz et al. |
| 5,832,367 | A | 11/1998 | Bamburak et al. |
| 5,845,198 | A * | 12/1998 | Bamburak et al. ............ 340/7.43 |
| 5,905,955 | A | 5/1999 | Bamburak et al. |
| 6,195,532 | B1 * | 2/2001 | Bamburak et al. ............ 340/7.42 |
| 6,282,420 | B1 | 8/2001 | Bamburak et al. |
| 6,298,235 | B1 | 10/2001 | Bamburak et al. |
| 6,374,106 | B2 | 4/2002 | Konno et al. |
| 6,418,318 | B1 | 7/2002 | Bamburak et al. |
| 6,782,259 | B2 * | 8/2004 | Bamburak et al. ............ 455/434 |
| 7,346,350 | B2 * | 3/2008 | Bamburak et al. ............ 455/434 |

FOREIGN PATENT DOCUMENTS

| | | |
|---|---|---|
| EP | 459344 | 4/1991 |
| EP | 510322 | 10/1992 |
| GB | 2257334 | 1/1993 |

* cited by examiner

FIG. 8

| 1 | 2 | 3 | 4 | 5 | 6 | 7 | 8 | 9 |
|---|---|---|---|---|---|---|---|---|
|   | A | a | C | B | b | D | F | E |

FIG. 9

| PRIORITY | SOC | SID | SID | ... | SID | SID |
|---|---|---|---|---|---|---|
| OPT | 001 | 43 | 57 | ... | 21 | 62 |
| 1 | 011 | 42 | 28 | ... | 52 | 68 |
| 2 | 100 | 45 | 23 | ... | 54 | 77 |
| ⋮ | ⋮ | ⋮ | ⋮ | | ⋮ | ⋮ |
| n | 111 | 49 | 24 | ... | 58 | 70 |
| PROHIBIT | 101 | 52 | 27 | ... | 50 | 75 |

METHOD FOR SELECTING A PREFERABLE WIRELESS COMMUNICATIONS SERVICE PROVIDER IN A MULTI-SERVICE PROVIDER ENVIRONMENT

CROSS REFERENCE TO RELATED INVENTION

This application is related to commonly assigned and concurrently filed US patent application entitled "A Method For Selecting A Wireless Communications Service Provider In A Multi-Service Provider Environment", Ser. No. 08/969,710.

BACKGROUND OF THE INVENTION

1. Field of the Invention

The present invention relates to communications; more specifically, communications in a multi-service provider environment.

2. Description of the Related Art

FIG. 1 illustrates a portion of the radio frequency spectrum. Frequency range 10 centered around 800 MHz has historically been known as the cellular frequency range and frequency range 12 centered about 1900 MHz is a newer defined frequency range associated with personal communication services (PCS). Each range of frequencies, i.e., the cellular and PCS, are broken into two portions. In cellular frequency range 10, there is uplink portion 14 which is used for communications from a mobile communication device to a base station such as a cellular base station. Portion 16 of cellular frequency range 10 is used for downlink communications, that is, communications from a cellular base station to a mobile communication device. In a similar fashion, Portion 18 of PCS frequency range 12 is used for uplink communications, that is, communications from a mobile communication device to a base station. Portion 20 of PCS frequency range 12 is used for downlink communications, i.e., communications from a base station to a mobile communication device.

Each of the frequency ranges are broken into bands which are typically associated with different service providers. In the case of cellular frequency range 10, frequency bands 30 and 32 are designated band "a" for uplink and downlink communications, respectively. In a particular geographic area, a cellular service provider is assigned frequency band "a" in order to carry out mobile communications. Likewise, in the same geographic area another cellular service provider is assigned frequency bands 34 (uplink) and 36 (downlink) which are designated band "b". The frequency spectrums assigned to the service providers are separated so as to not interfere with each other's communications and thereby enable two separate service providers to provide service in the same geographic area. Recently, the US Government auctioned the PCS frequency spectrum to service providers. As with the cellular frequency range, the PCS frequency range is broken into several bands where a different service provider may use a particular frequency band for which it is licensed within a particular geographical area. The PCS bands are referred to as A, B, C, D, E and F. The A band includes uplink band 50 and downlink band 52. The B band includes uplink band 54 and downlink band 56. Band C includes uplink band 58 and downlink band 60. Each uplink and downlink band of the A, B and C bands are approximately 30 MHz wide. The D band includes uplink band 62 and downlink band 64. The E band includes uplink band 66 and downlink band 68. Likewise, band F includes uplink band 70 and downlink band 72. The uplink and downlink bands of bands D, E and F are approximately 10 MHz wide each. It should be noted that with the cellular and PCS frequency bands, it is possible to have as many as eight different wireless communication service providers in a particular area.

Each of the different cellular and PCS bands consist of control channels and communication channels in both the uplink and downlink direction. In the case of analog cellular bands, there are 21 control channels for both the "a" and "b" bands. Each of the control channels include an uplink and a downlink portion. The control channels transmit information such as an SOC (System Operator Code), an SID (System Identifier Code), paging information call setup information and other overhead information such as information relating to registering with the mobile communication system. The portion of the cellular band's spectrum not occupied by the control channels is used for communication channels. Communication channels carry voice or data communications, where each channel consists of an uplink and downlink communications link. Presently there are several cellular communication standards. An analog standard known as EIA/TIA 553 was built upon the AMPS (Advanced Mobile Phone Service) standard. This standard supports 21 analog control channels (ACC) and several hundred analog voice or traffic channels (AVC). A newer standard is the EIA/TIA IS54B standard which supports dual mode operation. Dual mode operation refers to having an analog control channel, and either an analog voice/traffic channel or a digital traffic channel (DTC). The AVC or DTC are used for actual communications, and the ACC is used to transfer information relating to, for example, call set-ups, service provider identification, and the other overhead or system information.

A newer standard, the EIA/TIA IS136 standard supports communications covered by both analog and dual mode cellular, and also includes a totally digital communication scheme which was designed for the PCS frequency bands A-F and cellular frequency bands "a" and "b". This standard allows for a digital traffic channel (OTC) and a digital control channel (DCCH). In the case of the DTC, not only is the voice or data communicated, but in addition, a digital channel locator (DL) is transmitted in the DTC. The DL enables a mobile communication device that locks onto the DTC to use the information in the DL to locate a DCCH for purposes of obtaining information such as the SOC, SID, paging information, and other system overhead information carried on the digital control channel.

When a mobile communication device such as a mobile telephone attempts to register with the service provider, it locks onto a control channel and reads information such as the SOC and SID. If the SOC and/or SID correspond to a service provider with which the user has a communication services agreement, the telephone may register with the service provider's mobile communication system via the up-link control channel.

FIG. 2 illustrates a map of the United States illustrating cities such as Seattle, Chicago and Washington, D.C. For example, in Seattle frequency band A has been licensed to SOC (Service Operator Code) 001 with a SID of 43 and band C has been licensed to SOC 003 with a SID of 37. In Chicago, suppose that frequency band C has been licensed to SOC 001 with a SID equal to 57, and that band B has been licensed to SOC 003 with a SID of 51. In Washington, D.C. suppose that frequency band "a" has been licensed to a SOC 001 with a SID of 21, and that band A has been licensed to SOC 003 with a SID of 17. It should be noted that the same SOC may be found in several different locations although on different frequency bands. It should also be noted that the same SOC will be associated with different SIDs in each geographical area and that in the same geographic area different service providers have different SIDs. If a particular subscriber to a wireless telecommunication service has an agreement with a service provider having a SOC of 001, that subscriber would prefer to use systems with a SOC of 001 because the subscriber is likely to receive a less expensive rate. When the subscriber is in Seattle he/she would prefer to be on band A, and if in Chicago on band C, and if in Washington, D.C. on band "a". The above described situation presents a problem for a wireless communication service subscriber. As a subscriber moves from one area of the country to another, the telephone when turned on, searches for the "home" service provider, or the service provider with which the subscriber has a prearranged agreement. If for example, the subscriber travels from Seattle to Chicago, when turning the phone on in Chicago, the phone will search through the different bands of the spectrum to identify the service operator with the code 001 in order to find the desired service provider.

In order to find a particular service provider, the phone may have to search through both the "a" and "b" cellular bands, and through the eight PCS bands. It should be recalled that there are up to 21 different ACCs in each of the "a" and "b" cellular bands. It may be necessary to check 42 ACCS in order to find an ACC from which a SOC or SID may be obtained. Additionally, searching for a particular SOC or SID in PCS bands A through F is particularly time consuming. The digital control channels (DCCHs), which contain the SOC and SID, are not assigned to specific frequencies within a particular PCS band. As a result, the mobile communication device may find it necessary to search through the spectrum of each PCS band looking for a DCCH, or an active DTC that has a digital channel locator (DL) which will direct the mobile communication device to the DCCH. As illustrated above, the process of searching for a particular service provider is laborious and may require a period of time on the order of several minutes.

SUMMARY OF THE INVENTION

An embodiment of the present invention provides a method for locating a particular or desirable communications service provider in an environment having a plurality of service providers. After power-up, a mobile communications device such as a cellular telephone, checks the most recently used control channel to determine whether an optimal service provider is available on that channel. If an optimal service provider is not available or if that channel is not available, the mobile communication device performs a search through frequency spectrum in a pre-determined order until an optimal or acceptable service provider is located.

In another embodiment of the invention, the frequency spectrum is searched in a pre-determined order that changes based on information entered by a mobile communication device distributor or mobile communication device user. In yet another embodiment of the invention, the pre-determined order for searching the spectrum for service providers is updated by over the air programming. In still another embodiment of the present invention, the pre-determined order for searching is based on the mobile communication device's operational history.

In yet another embodiment of the invention, the communications device registers with a less preferred service provider in a first frequency band. While remaining registered with the less preferred service provider, the device examines several frequency bands in the order specified by the frequency band search schedule. A frequency band is examined by dividing the frequency band into many sub-bands, and by locating the strongest signal above a threshold within the sub-band being examined. The examination continues until a second frequency band having a more preferred service provider is located. The communication device then registers with the more preferred service provider.

BRIEF DESCRIPTION OF THE DRAWINGS

FIG. 8 illustrates a search schedule; and

FIG. 9 illustrates a prioritized list of service providers.

DETAILED DESCRIPTION OF THE INVENTION

Figure 3:
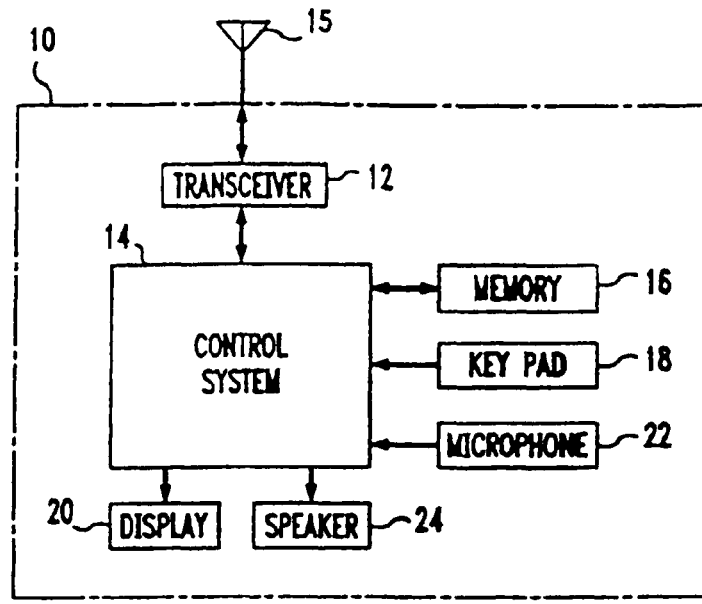
FIG. 3 is a block diagram of a mobile communication device.

FIG. 3 illustrates a block diagram of a mobile communication device such as a cellular telephone or personal communication device. Mobile communication device 10 includes transceiver 12 which sends and receives signals from antenna 14. Mobile communication device 10 is controlled by control system 14 which may include a microprocessor or a microcomputer. Control system 14 uses memory 16 for storing programs that are executed and for storing information that is entered by the user, the distributor, the communication services provider or the manufacturer. Information such as user preferences, user telephone numbers, preferred service provider lists and frequency search schedules are stored in memory 16. Memory 16 may include storage devices such as random access memory (RAM), read only memory (ROM) and/or programmable read only memory (PROM). A user communicates with control system 14 via keypad 18. Control system 14 communicates information to the user via display 20. Display 20 may be used to display information such as status information and items such as telephone numbers entered via keypad 18. Sound information to be transmitted from the mobile communication device 10 is received via microphone 22, and sound communications received by mobile communication device 10 are played to the user via speaker 24.

Figure 1:
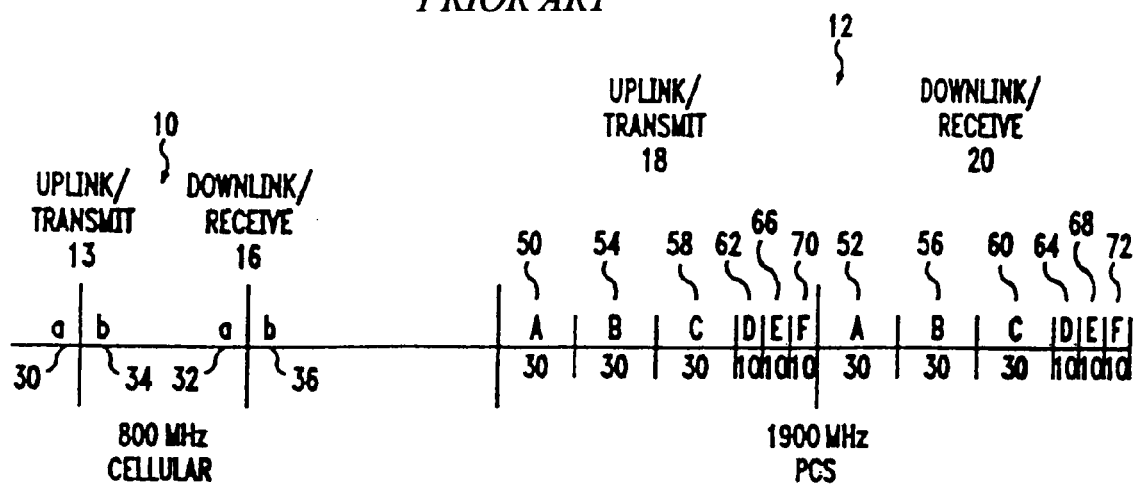
FIG. 1 illustrates the frequency spectrum used for wireless communications.
Figure 2:
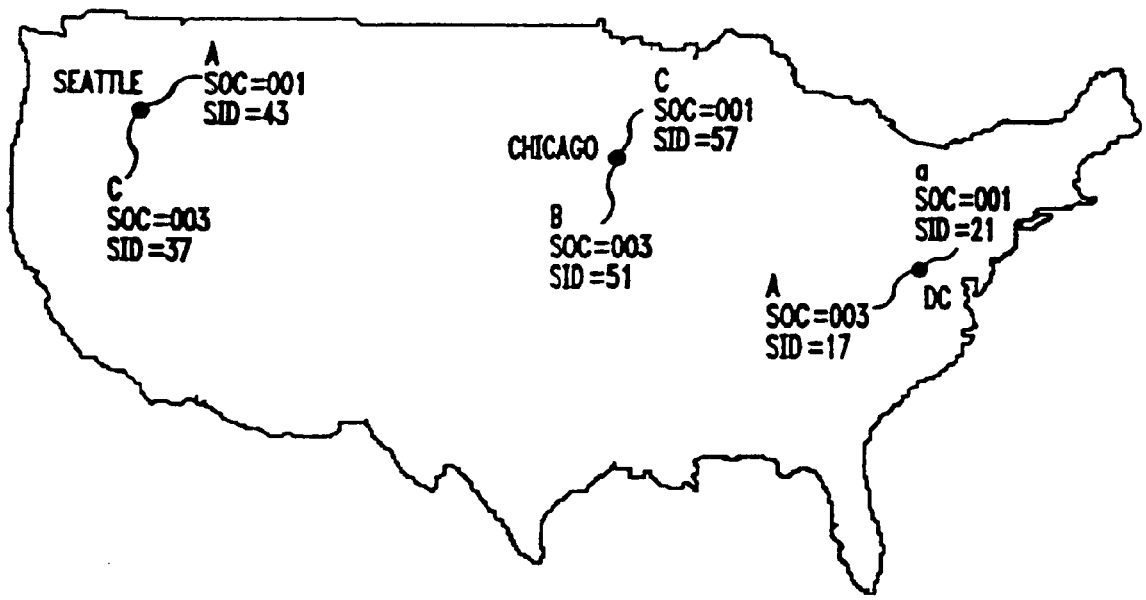
FIG. 2 illustrates service areas within the United States.

After initially powering-up, a mobile communication device locates a service provider and registers with the service provider. Recalling FIG. 1, service providers are located at a plurality of frequency bands across the radio spectrum. In order to find a service provider, the communication device searches the spectrum to find service providers. The communications device examines received service provider code e.g., SOCs (Service Operator Code) or SIDs (System Identification Code) to determine whether the service provider is an optimal, preferred or prohibited service provider.

Figure 4:
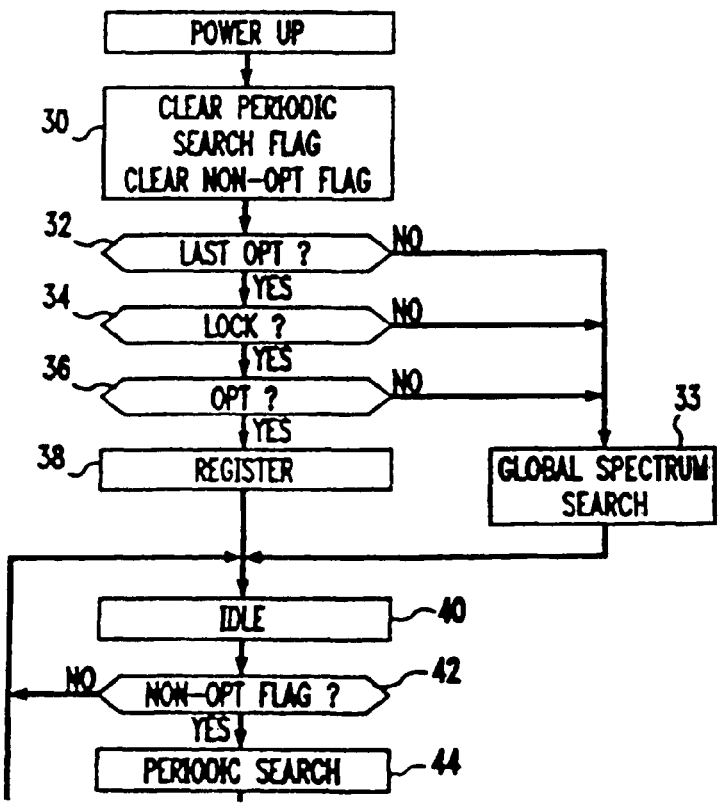
FIG. 4 is a flow chart illustrating a spectrum searching routine.

FIG. 4 illustrates a process or program that control system 14 executes in order to find a desirable service provider. After power-up, step 30 is executed to initialize a non-optimal flag by clearing the flag. Step 32 determines whether the last service provider, that is, the service provider used before powered down, was an optimal service provider. This is determined by checking the SOC or SID of the last service provider and determining whether that service provider's SOC or SID corresponds to the SOC or SID of an optimal service provider. The SOC or SID of the last service provider and a list of optimal and preferred service providers is stored in memory 16. If in step 32 it is determined that the prior service provider was not optimal, a global spectrum search is executed. If the last service provider was optimal, step 34 is executed where system 14 attempts to lock onto the control signal of the service provider. If the lock is unsuccessful, which may indicate that that control channel is no longer available or out of range, the global spectrum search is executed. If a lock is successful, step 36 is executed. In step 36, it is determined whether the control channel contains the SOC or SID of an optimal service provider. Once again, this is determined by comparing the SOC or SID from the control signal with a list of optimal service provider SOCs or SIDs. If the SOC or SID does not belong to that of an optimal service provider, the global spectrum search 33 is executed and the identity of the frequency band in which the non-optimal SOC or SID was located is passed to global search routine 33 so as to avoid unnecessarily searching this portion of the spectrum again. If in step 36 it is determined that an optimal service provider has been located, step 38 registers communication device 10 with the service provider. Step 40 is an idle state where control system 14 simply monitors the control channel of the service provider for communication system overhead information and for paging information that may indicate an incoming communication. While in idle state 40, a timer is activated which permits a low-duty cycle search to be performed if the phone is presently registered in a non-optimal service provider system. This situation may arise if global spectrum search 33 provides a preferred but not optimal service provider. Periodically, such as every 5 minutes, step 42 is executed to determine whether the non-optimal flag has been set, if the non-optimal flag is not set, control system 14 returns to idle step 40. If the non-optimal has been set, step 42 leads to the execution of periodic search routine 44 where a search is conducted in order to attempt to locate an optimal service provider. If periodic search routine 44 produces an optimal service provider, the non-optimal service provider flag is cleared and the mobile communication device registers with the optimal service providers while executing periodic search routine 44. The mobile communications device then enters an idle state by executing step 40. If an optimal service provider is not located in routine 44, control system 14 returns to an idle state by executing step 40.

Figure 5:
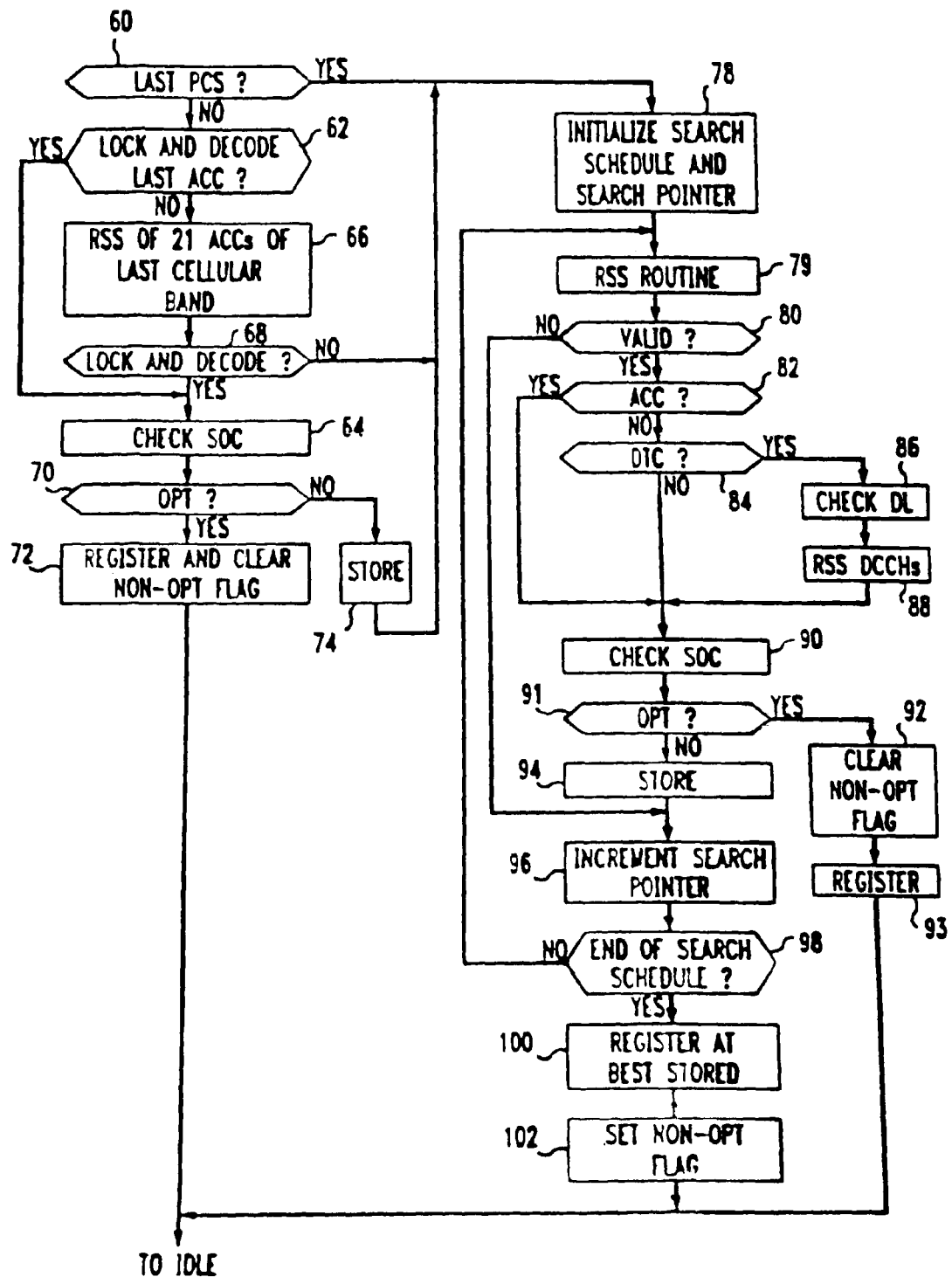
FIG. 5 is a flow chart illustrating the global spectrum search routine.

FIG. 5 illustrates a flowchart of global spectrum search routine 33 which is executed by control system 14. At step 60 it is determined whether the last control channel used by the mobile communication device was a personal communication services related control channel, that is, a control channel in the bands A through F. If the last control channel was not a PCS control channel, step 62 is executed. In step 62 it is determined whether the mobile communication device can lock onto, or receive and decode the last ACC (Analog Control Channel) that was used. If the mobile communication device can successfully lock onto the last ACC, step 64 is executed. If the communication device cannot lock onto the last ACC, step 66 is executed. In step 66, an RSS (Received Signal Strength Scan) is performed. This step involves the mobile communication device tuning to each of the 21 ACCs associated with the cellular band of the last used ACC, and attempting to lock onto the strongest received signal. In step 68, it is determined whether a lock has been achieved. In step 68 if a lock is not obtained, a predetermined search schedule is executed in order to find a service provider, if in step 72 a lock is obtained, step 64 is executed where the SOC or SID obtained from the control channel is compared to a list of optimal SOCs or SIDs. In step 70 if the received SOC or SID is associated with an optimal service provider, step 72 is executed where the mobile communication device clears the non-optimal flags, registers with the communication service provider, and then enters an idle state by executing step 40 of FIG. 4. If, in step 70 it is determined that an optimal service provider SOC or SID was not received, step 74 is executed where the identity of the frequency band just searched is stored in memory 16. Step 78 is executed after step 74, after 68 if a lock is not obtained, or after step 60 if the last control signal was from a PCS frequency band. In step 78, a search schedule is downloaded using a master search schedule. When downloading the search schedule in step 80, frequency bands previously searched are removed from the downloaded schedule so as to avoid searching bands that have already been searched. For example, bands searched in the search routine discussed with regard to FIG. 4 and the cellular band search discussed with regard to step 74 are removed from the search schedule. After the modified search schedule has been loaded, a search pointer is initialized to point to the first band identified by the modified search schedule. The first band identified on the modified schedule is searched with regard to received signal strength (RSS) in step 79's RSS routine. In the case of bands "a" and "b", the ACC with the strongest signal is selected. In the case of the PCS bands, that is the bands A through F, 2.5 MHz sections of each band are searched in 30 kilohertz steps. The mobile communication device tunes to the strongest signal that crosses a minimum threshold, e.g., −110 dBm, within the 2.5 MHz band being examined. In step 80 it is determined whether the signal is valid, that is, conforms to one of the above mentioned standards. If it is not valid, the search pointer is incremented in step 96, and if the signal is valid, step 82 is executed. In step 82 it is determined whether the signal is an ACC. If the signal is an ACC, the SOC or SID is decoded in step 90. If the signal is not an ACC, step 84 determines whether the received signal is a digital traffic channel (DTC) or a digital control channel (DCCH). If the signal is an DCCH the SOC or SID is extracted in step 90. If it is determined that the received signal is a DTC, step 86 is executed where the DL (digital channel locator) is extracted to identify the location of the DCCHs associated with the DTC that has been received. In step 88, the mobile communication device tunes to the strongest DCCH of the digital control channels identified by the DL. In step 90, the SOC or SID of the received DCCH is extracted and in step 91, it is determined whether the SOC or SID is associated with an optimal service provider. If the SOC or SID is associated with an optimal service provider, step 92 clears the non-optimal flag and step 96 registers the mobile communication device with the service provider. After step 96, the communication device enters the idle state in step 40 of FIG. 4. If in step 92 it is determined that the SOC or SID does not belong to that of an optimal service provider, step 94 is executed where the SOC or SID is stored in memory 16 indicating whether the SOC or SID was at least a preferred rather than an undesirable or prohibited service provider with the spectral location of the SOC's or SID's control channel. In step 96 the search pointer that identifies the band being searched is advanced to identify the next band in the schedule for searching. In step 98 it is determined whether the pointer has reached the end of the search schedule. If the end of the search schedule has not been reached, step 82 is executed to perform another received signal strength search routine as discussed above, and if the last frequency band has been searched, step 100 is executed. In step 100 the mobile communication device registers with the best stored SOC or SID, that is, an SOC or SID that has at least been associated with a preferred service provider. The best service provider can be identified by comparing the stored SOCs or SIDs with a list of preferred SOCs or SIDs.

The list of preferred SOCs or SIDs can include the optimal SOC(s) or SID(s) and a prioritized list of preferred SOCs or SIDs where the higher priority will get preference for registration. The listing also includes undesirable or prohibited SOC(s) or SID(s) that are used only in emergencies (e.g., 911 calls) or if the user enters an override command. After registering with the service provider in step 100, step 102 is executed to set the non-optimal flag, and then step 40 of FIG. 4 is executed where the mobile communication device enters the idle state.

It should be noted that the searching operation of FIGS. 4 and 5 may be carried out in a simplified manner. With regard to FIG. 4, control system 14 may execute step 33 after step 30 while always skipping steps 32, 34, 36 and 38. With regard to FIG. 5, control system 14 may start the global spectrum search with step 78 while always skipping steps 60-74.

Figure 6:
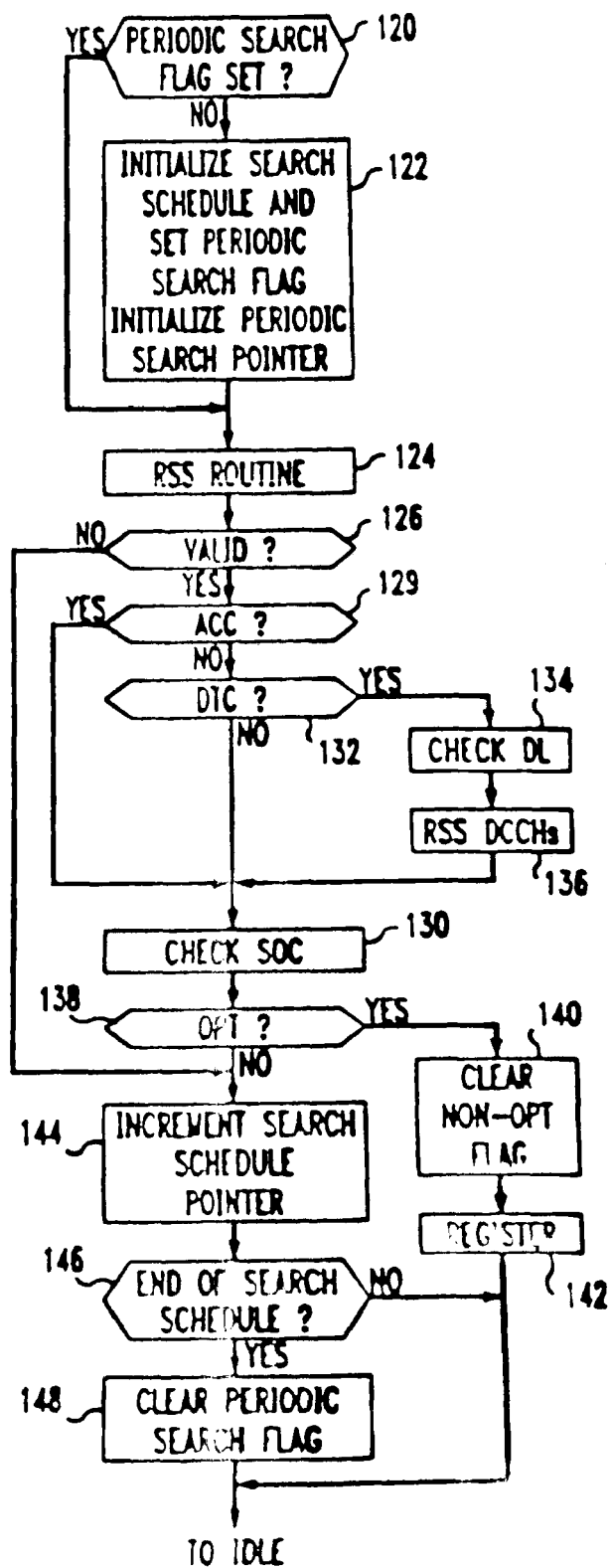
FIG. 6 is a flow chart illustrating a periodic search routine.

FIG. 6 illustrates a flowchart for the periodic search routine executed by control system 14. In step 120 it is determined whether the periodic search flag has been set. If the periodic search flag has not been set, step 122 is executed where periodic search flag is set and the search schedule is initialized by loading the master search schedule into the search schedule used by the periodic search routine; however, the frequency band currently being received is not included in the search schedule used for the periodic search routine. Step 122 also sets a search pointer to the first band in the search schedule. In step 124 a received signal strength search (RSS) routine is conducted. As in step 79 of the global spectrum search routine of FIG. 5, step 124 is a RSS routine of any PCS and cellular bands that are in the search schedule. In the case of a cellular band search, the 21 ACCs are searched using a received signal strength search i.e., the transceiver tunes to the strongest ACC. In the case of a PCS frequency band search, as discussed earlier, each band is broken into segments of approximately 2.5 MHz where a search of each segment is conducted in 30 kilohertz steps. The strongest signal within the 2.5 MHz segment and above a minimum threshold, such as −110 dBm, is selected. In step 126 the selected signal is examined to determine if it is valid by conforming to one of the previously referenced standards. If the signal is invalid, step 144 is executed and if the signal is valid, step 129 is executed. Step 129 determines whether the signal is an ACC. If the signal is an ACC, step 130 is executed when the SOC or SID is extracted and if the signal is not an ACC, step 132 is executed. Step 132 determines whether a DTC signal has been received. If the signal is not a DTC signal (therefore it is a DCCH signal), step 130 is executed to extract the SOC or SID from the DCCH signal. If in step 132 it is determined that a DTC has been received, step 134 is executed to extract the DL to enable tuning to a DCCH. In step 136 a received signal strength search is conducted of the DCCHs where the strongest signal is selected, and then step 130 is executed to extract an SOC or SID from the signal. In step 138 it is determined whether the SOC or SID is an optimal SOC or SID. If the SOC or SID is optimal, step 140 clears the non-optimal flag and in step 142 the mobile communication device registers with the service provider associated with the optimal SOC or SID. Step 40 of FIG. 4 is then executed to enter the idle state. If in step 138 it is determined that the SOC or SID was not an optimal service provider, step 144 is executed. In step 144 the search pointer is incremented to the next band to be searched. In step 146, it is determined whether the entire search schedule has been completed. If the schedule has not been completed, step 40 is executed so that the mobile communication device can be returned to the idle state. If in step 146 it is determined that the search schedule has been completed, step 148 clears the periodic search flag and then step 40 is executed so that the mobile communication device can enter the idle state.

Figure 7:
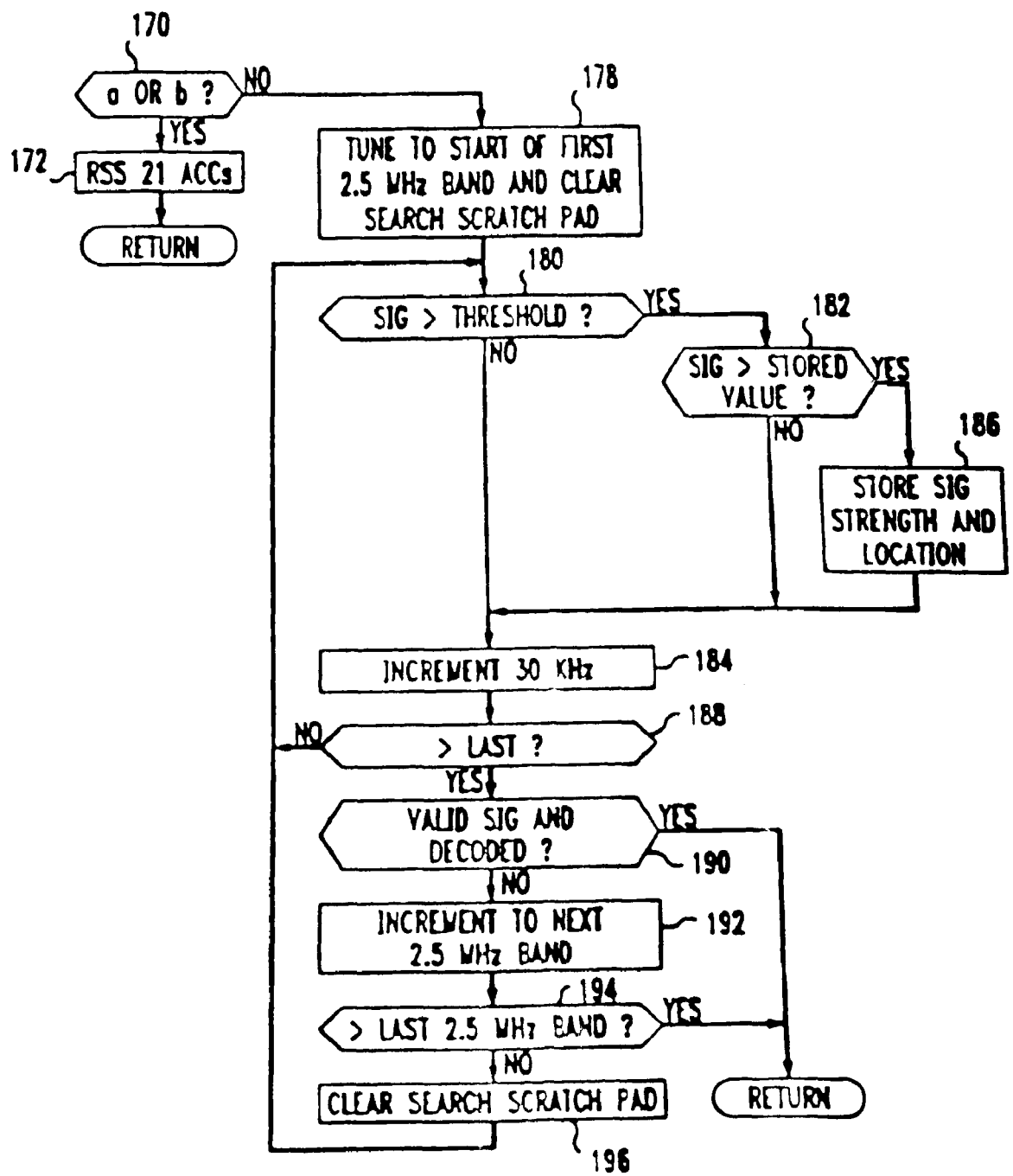
FIG. 7 is a flow chart illustrating a received signal strength search routine.

FIG. 7 illustrates a flow chart of the RSS routine or received signal strength search routine which is carried out, for example, in steps 79 of FIGS. 5 and 124 of FIG. 6. Step 170 determines whether the band being searched is one of the "a" or "b" cellular bands. If a cellular band is being searched, step 172 is executed where the 21 ACCs are searched to determine which is the strongest, the strongest ACC is tuned to by transceiver 12 under the control of control system 14 and then the RSS routine is exited. If in step 170 it is determined that a cellular band is not being searched, step 178 tunes transceiver 12 to the beginning of the first 2.5 MHz band in the PCS band being searched. Step 178 also clears a search scratch pad memory location in memory 16. The search scratch pad is used to record the amplitude or strength and location of a received signal in step 180 it is determined whether the signal being received is greater than a threshold. If the signal is greater than the threshold, step 182 is executed, if the signal is not greater than the threshold, step 184 is executed. In step 182 it determined whether the received signal strength is greater than the signal strength value stored in the search scratch pad. If the received signal is not greater, then step 184 is executed. If the received signal strength is greater, step 186 is executed and the present signal strength is recorded in the search scratch pad with the received signal's location in the spectrum. In step 184, transceiver 12 is tuned to a frequency 30 kilohertz higher than the frequency at which it was tuned. Step 188 determines whether the new frequency extends beyond the 2.5 MHz band currently being searched. If the new frequency does not exceed the 2.5 MHz band, step 180 is executed to once again examine received signal strength relative to the signal strength or amplitude value stored in the search scratch pad. If in step 188 it is determined that the 30 kilohertz increment extends beyond the 2.5 MHz band being examined, step 190 is executed. In step 190, the transceiver tunes to the signal location specified in the search scratch pad. If the signal is a valid signal and can be decoded, the RSS routine is exited. If the signal is not valid or cannot be decoded, (e.g., the signal does not conform to the above-referenced standards) step 192 is executed. In step 192, the transceiver is tuned to the beginning of the next 2.5 MHz band within the PCS band being searched. Step 194 determines whether the new 2.5 MHz band extends beyond the PCS band currently being searched. If the new increment extends beyond the PCS band being searched, the periodic search routine is exited. If the 2.5 MHz increase does not result in extending beyond the PCS band being searched, step 196 is executed. In step 196, the search scratch pad containing signal strength measurements and signal location information is cleared to prepare for searching another band. After step 196, step 180 is executed as described above.

FIG. 8 illustrates a master search schedule. The master schedule is used to initialize search schedules used in the above described search routines. The master search schedule is stored in a memory such as memory 16. The master search schedule can be initially programmed by the mobile communication device's manufacturer, distributor or user. It should be noted that the first location in the search schedule is left unprogrammed. If left blank, the blank is ignored when initializing the search schedules for the search routines. It is desirable for the first location to be programmed with the band in which the user's home service provider resides. For example, if the user has a service agreement with a service provider who is licensed to operate in PCS band B within the SID or geographical area in which the user most frequently is located, band B is programmed into the first slot of the master search schedule. If, for example, band B is programmed in the first slot, the slot originally containing band B is made blank. This avoids searching the same band twice. It should also be noted that the user can vary the master search schedule through keypad 18. Additionally, the master search schedule may be reprogrammed using signals received over the wireless communication channel. For example, the mobile communication device may be restricted to accepting new programming for the master search schedule only from a service provider transmitting the home SID and an optimal SOC. It is also possible to accept over the air programming if the service provider sends a prearranged code. It is desirable to restrict the over the air programming through the use of codes, home SIDs and/or optimal SOCs to avoid unintentional or undesirable altering of the master search schedule. Over the air programming may be implemented using for example, logical sub-channels of a digital control channel. The logical sub-channels have the capability to transmit data addressed to a particular mobile communication device and to receive data, such as confirmation data, from the mobile communications device.

When the search schedules are initialized using the master search schedule, it is also possible to precede the first location in the master search schedule with other frequency bands based on, for example, the prior history of the mobile communication device's use. For example, the first location searched may be the location where the phone was last turned off (powered down) or the location where the phone was last turned on (powered up).

FIG. 9 illustrates a table stored in memory 16 defining the optimal service provider's SOC and SIDs, and preferred service provider's SOCs and SIDs. The SOC or SID with the lowest number has the highest priority and is preferred over service providers with higher numbers and therefore a lower priority. For example, an SOC or SID with a priority level 2 would be preferred over an SOC or SID with a priority level of 5. The table may also include SOCs or SIDs that are undesirable or prohibited. In the case of SOCs or SIDs that are prohibited, it is desirable to permit connection to the prohibited SOCs or SIDs when an emergency call, such as a 911 call, is attempted or when the user enters an override command. The table in FIG. 9 may be programmed by the manufacturer, by the distributor when the phone is purchased or by the user. It is also possible to program the table of FIG. 9 over the air using restrictions similar to those used when programming the master search schedule over the air.

What is claimed is:

1. A method performed by a wireless communication device comprising a list of frequency bands in an order, each frequency band comprising a plurality of frequencies, the plurality of frequencies being used to transmit a plurality of signals, the method comprising:
    registering the wireless communication device with a non-optimal service provider associated with one of the plurality of signals transmitted on one of the plurality of frequencies of one of the frequency bands; and
    searching the frequency bands in accordance with the order of the list until the wireless communication device is registered with an optimal service provider or a last frequency band of the list of frequency bands has been searched, the searching of the frequency bands comprising:
        selecting a frequency band from the list of frequency bands in accordance with the order in the list;
        identifying a signal of the plurality of signals transmitted using the plurality of frequencies of the frequency band that is selected, the signal that is identified having a received signal strength that is greater than a respective received signal strength of any other of the plurality of signals transmitted on the plurality of frequencies of the frequency band that is selected;
        determining a service provider code based on the signal that is identified;
        determining whether the service provider code is associated with the optimal service provider; and
        if the service provider code is associated with the optimal service provider, terminating the searching the frequency bands and registering with the optimal service provider.

2. The method of claim 1, wherein before the searching the frequency bands, a signal associated with the non-optimal service provider with which the wireless communication device is registered is a control channel, and the wireless communication device is in an idle state in which communications functions of the wireless communication device are limited to monitoring the control channel for information.

3. The method of claim 2, further comprising:
    before the searching the frequency bands and while the wireless communication device is in the idle state, starting a timer having a predetermined duration; and
    waiting until an expiration of the predetermined duration before transitioning out of the idle state and searching the frequency bands.

4. The method of claim 2, wherein the searching the frequency bands further comprises:
    before the selecting the frequency band from the list of frequency bands in accordance with the order in the list, waiting until a predetermined time period expires before transitioning out of the idle state; and
    after the determining whether the service provider code is associated with the optimal service provider, returning the wireless communication device to the idle state.

5. The method of claim 1, wherein the searching the frequency bands further comprises:
    determining whether the signal that is identified is valid by determining whether the signal that is identified conforms with a cellular communication standard.

6. The method of claim 1, wherein the searching the frequency bands further comprises:
    determining whether the signal that is identified is a digital traffic channel; and
    if the signal that is identified is the digital traffic channel:
        using the digital traffic channel to obtain a digital channel locator,
        using the digital channel locator to locate a digital control channel associated with the digital traffic channel,
        determining a received signal strength of a signal transmitted on the digital control channel, and
        if the received signal strength of the signal transmitted on the digital control channel is greater than a received signal strength of any other signal of the plurality of signals transmitted on the plurality of frequencies of the frequency band that is selected, replacing the signal that is identified with the signal transmitted on the digital control channel.

7. A computer-readable medium having instructions that when executed by a processor perform the method of claim 1.

8. A method performed by a wireless communication device comprising a list of frequency bands in an order, each frequency band comprising a plurality of control channels, the wireless communication device being registered with a service provider associated with one of the plurality of control channels of one of the frequency bands, the wireless communication device being configured to communicate on the one control channel associated with the service provider, the wireless communication device operating in an idle state, wherein the wireless communication device monitors the one control channel associated with the service provider, the method comprising:
- transitioning out of the idle state;
- determining whether the service provider with which the wireless communication device is registered is optimal; and
- when the service provider is non-optimal:
  - selecting a next frequency band from the list of frequency bands,
  - identifying a control channel of the plurality of control channels of the next frequency band that is selected having a strongest received signal strength at the wireless communication device, the control channel carrying a service provider code,
  - determining whether the service provider code is associated with an optimal service provider,
  - when the service provider code is associated with the optimal service provider, registering the wireless communication device with the optimal service provider, and
  - returning the wireless communication device to the idle state.

9. The method of claim 8, further comprising:
excluding the frequency band comprising the control channel associated with the service provider with which the wireless communication device is registered from the list of frequency bands.

10. The method of claim 8, further comprising:
repeating the method of claim 8 until the wireless communication device is registered with the optimal service provider or all of the frequency bands have been selected from the list of frequency bands.

11. The method of claim 8, further comprising when the service provider is non-optimal:
determining whether the control channel that is identified is valid by determining whether the control channel that is identified conforms with a cellular communication standard, the determining of whether the service provider code is associated with the optimal service provider code being performed only if the control channel that is identified is valid.

12. A computer-readable medium having instructions that when executed by a processor perform the method of claim 8.

13. A method performed by a wireless communication device, the method comprising:
- obtaining a master search schedule identifying a plurality of frequency bands in a predetermined order, each of the plurality of frequency bands comprising a plurality of control signals each being transmitted using a frequency of a respective frequency band;
- searching each of the plurality of frequency bands one at a time in accordance with the master search schedule, to identify a first control signal, the first control signal being associated with a preferred service provider and having a received signal strength that is the stronger than a received signal strength of any of the other of the plurality of control signals within a same frequency band as the first control signal;
- registering with the preferred service provider;
- determining the wireless communication device is not registered with an optimal service provider;
- after determining the wireless communication device is not registered with the optimal service provider, conducting a search of each of at least a portion of the plurality of frequency bands identified by the master search schedule, the search terminating when the plurality of frequency bands have been searched by the search or the wireless communication device is registered with the optimal service provider, for each frequency band identified by the master search schedule, the periodic search comprising:
  - identifying a second control signal of the plurality of control signals of a next frequency band associated with a service provider and having a received signal strength that is the stronger than a received signal strength of any of the other of the plurality of control signals within the next frequency band;
  - determining whether the service provider associated with the second control signal is the optimal service provider; and
  - when the service provider associated with the second control signal is the optimal service provider, registering with the optimal service provider.

14. The method of claim 13, further comprising:
before the conducting the ordered search, removing the frequency band of the first control signal from the plurality of frequency bands identified by the master search schedule.

15. The method of claim 13, further comprising:
before the searching each of the plurality of frequency bands one at a time in accordance with the master search schedule, inserting a frequency band associated with a home service provider of the wireless communication device in the plurality of frequency bands as a first frequency band in the predetermined order of the plurality of frequency bands.

16. The method of claim 13, further comprising:
after the registering with the preferred service provider and after the determining the wireless communication device is not registered with the optimal service provider, transitioning to an idle state; and
while in the idle state, waiting until a predetermined time period has elapsed.

17. The method of claim 13, wherein the search further comprises:
after the determining whether the service provider associated with the second control signal is the optimal service provider, transitioning to an idle state.

18. The method of claim 13, wherein the wireless communication device comprises a data structure storing a plurality of service provider codes, each service provider code associated with a service provider, the data structure further comprising for each service provider, an indicator indicating whether the service provider is optimal, and
determining whether the service provider associated with the second control signal is the optimal service provider comprises extracting a service provider code from the second control signal and comparing the service provider code that is extracted with the plurality of service provider codes stored in the data structure to identify the service provider associated with the service provider code that is extracted, and determining the service provider that is identified as the optimal service provider if the indicator associated with the indicator service provider indicates the service provider is the optimal service provider.

19. The method of claim 13, wherein the wireless communication device comprises a data structure storing a plurality of service provider codes, each service provider code associated with a service provider, the data structure further comprising for each service provider, an indicator indicating whether the service provider is optimal, preferred, or non-preferred, the data structure further comprises a ranking of the service providers, the method further comprising:

searching each of at least a portion of the plurality of frequency bands one at a time in accordance with the master search schedule, wherein the searching comprises:

identifying a control signal having a received signal strength that is stronger than a received signal strength of any of the other of the plurality of control signals within one of the frequency bands;

extracting a service provider code from the control signal that is identified;

comparing the service provider code that is extracted with the plurality of service provider codes stored in the data structure to identify the service provider associated with the service provider code that is extracted; and when the indicator indicates the service provider that is identified is a preferred service provider, storing the frequency used to transmit the control signal and the service provider code that is extracted, and identifying a first control signal by selecting the control signal transmitted on one of the stored frequencies that is associated with the highest ranking service provider in accordance with the ranking stored by the data structure.

20. The method of claim 13, further comprising before the obtaining the master search schedule:

powering up the wireless communication device following a powering down thereof;

identifying a service provider with which the wireless communication device was registered before the powering down; and inserting a frequency band comprising the frequency associated with the service provider that is identified in the plurality of frequency bands of the master search schedule as a first frequency band in the predetermined order of the plurality of frequency bands.

21. The method of claim 20, further comprising:

if the frequency band comprising the frequency associated with the service provider that is identified is one of the plurality of frequency bands identified in the master search schedule and has an original location within the predetermined order of the plurality of frequency bands before the frequency band is inserted into the predetermined order of the plurality of frequency bands as the first frequency band, removing the frequency band from its original location within the predetermined order of the plurality of frequency bands.

22. The method of claim 13, wherein the search further comprises:

determining whether the second control signal is valid by determining whether the second control signal conforms with a cellular communication standard, the determining of whether the service provider associated with the second control signal is the optimal service provider being performed only if the second control signal is valid.

23. A computer-readable medium having instructions that when executed by a processor perform the method of claim 13.

* * * * *